United States Patent
Jamjoom et al.

(10) Patent No.: US 8,346,766 B2
(45) Date of Patent: Jan. 1, 2013

(54) EFFICIENT CALCULATION OF NODE PROXIMITY ON GRAPHS WITH SIDE INFORMATION

(75) Inventors: Hani T. Jamjoom, Hawthorne, NY (US); Huiming Qu, Hawthorne, NY (US); Hanghang Tong, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 12/638,514

(22) Filed: Dec. 15, 2009

(65) Prior Publication Data

US 2011/0145261 A1   Jun. 16, 2011

(51) Int. Cl.
    *G06F 17/30*   (2006.01)
(52) U.S. Cl. ........................................ 707/726; 707/723
(58) Field of Classification Search .................. 707/790, 707/798

See application file for complete search history.

(56) References Cited

U.S. PATENT DOCUMENTS

| | | |
|---|---|---|
| 7,983,230 B1 | 7/2011 | Li et al. |
| 7,995,476 B2 | 8/2011 | Lou et al. |

OTHER PUBLICATIONS

Tong et al. Measuring Proximity on Graphs with Side Information, Proceeding of the 2008, Eightth IEEE International Conference on Data Mining (Dec. 15-19, 2008),. ICDM. IEEE Computer Society, Washington DC, 598-607.*

Tong, H., et al., "Measuring Proximity on Graphs with Side Information," Proceedings of the 2008 Eighth IEEE international Conference on Data Mining (Dec. 15-19, 2008). ICDM. IEEE Computer Society, Washington, DC, 598-607.

Tong, H., et al., "Random Walk with Restart and Its Applications", Knowledge and information systems, an International Journal (KAIS) 2008.

Achlioptas, D. et al., "Fast Computation of Lowrank Matrix Approximations", J. ACM, 2007, 54(2).

Aditya, B., et al., "Banks: Browsing and keyword searching in relational databases", VLDB, 2002, pp. 1083-1086.

Agarwal, A.,et al.,"Learning to rank networked entities", KDD, 2006, pp. 14-23.

Balmin, A., et al., "ObjectRank: Authority-based keyword search in databases", VLDB, 2004, pp. 564-575.

Cheng, H, et al., "Recommendation via query centered random walk on k-partite graph"ICDM, 2007, pp. 457-462.

Drineas, P., et al. "Fast monte carlo algorithms for matrices iii: Computing a compressed approximate matrix decomposition", SIAM Journal of Computing, 2005.

Faloutsos, C., et al. "Fast discovery of connection subgraphs", KDD, 2004, pp. 118-127.

Geerts, F., et al., "Relational link-based ranking", VLDB, 2004, pp. 552-563.

Groetschel, M., et al., "Design of survivable networks: Handbooks in Operations Research and Management Science", 7: Network Models, 1993, North Holland.

Guha, R. V., et al., "Propagation of trust and distrust", WWW, 2004, pp. 403-412.

(Continued)

*Primary Examiner* — Baoquoc N To
(74) *Attorney, Agent, or Firm* — Scully, Scott, Murphy & Presser, P.C.; Daniel P. Morris, Esq.

(57) ABSTRACT

In a computerized data mining context, user input relating to positive and negative information is incorporated into node proximity measurements on a weighted, directed graph. Random walk results are updated without a full matrix inversion by using selective update to a low rank approximation and to inversion results.

20 Claims, 14 Drawing Sheets

OTHER PUBLICATIONS

Haveliwala T. H., "Topic-sensitive pagerank: A contextsensitive ranking algorithm for web search" IEEE Trans. Knowl. Data Eng., 2003, 15(4): 784-796.

He, J., et al., "Manifold-ranking based image retrieval", ACM Multimedia, 2004, pp. 9-16.

Kanth K. V. R., et al., "Dimensionality reduction for similarity searching in dynamic databases", SIGMOD Conference, 1998, pp. 166-176.

Koren, Y., et al,. "Measuring and extracting proximity in networks", KDD, 2006, pp. 245-255.

Liben-Nowell D., et al., "The link prediction problem for social networks", Proc. CIKM, 2003.

Pan, J.-Y., et al., "Automatic multimedia cross-modal correlation discovery", KDD, 2004, pp. 653-658.

Sun, J., H., et al., "Neighborhood formation and anomaly detection in bipartite graphs", ICDM, 2005, pp. 418-425.

Sun J., et al., "Less is more: Compact matrix decomposition for large sparse graphs", SDM, 2007.

Tong H., et al., "Center-piece subgraphs: problem definition and fast solutions", KDD, 2006, pp. 404-413.

Tong H., et al., "Fast best-effort pattern matching in large attributed graphs", KDD, 2007, pp. 737-746.

Tong H., et al., "Fast direction-aware proximity for graph mining", KDD, 2007, pp. 747-756.

Tong H., et al., "Proximity tracking on time-evolving bipartite graphs", SDM, 2008, pp. 704-715.

"Woodbury matrix identity", Wikipedia.

Indyk, P., "Stable distributions, pseudorandom generators, embeddings and data stream computation" FOCS, 2000, pp. 189-197.

US Office Action dated Dec. 29, 2011 received in a related application namely, U.S. Appl. No. 12/638,531.

United States Office Action dated Sep. 6, 2012, received in related U.S. Appl. No. 12/638,531.

* cited by examiner

| Table 1. Symbols | |
|---|---|
| Symbol | Definition and Description |
| $\mathbf{A}, \mathbf{B}, \ldots$ | matrices (bold upper case) |
| $\mathbf{A}(i, j)$ | element at the $i^{th}$ row and $j^{th}$ column of $\mathbf{A}$ |
| $\mathbf{A}(i, :)$ | $i^{th}$ row of matrix $\mathbf{A}$ |
| $\mathbf{A}(:, j)$ | $j^{th}$ column of matrix $\mathbf{A}$ |
| $\mathbf{a}, \mathbf{b}, \ldots$ | column vectors |
| $\mathcal{I}, \mathcal{J}, \ldots$ | sets (calligraphic) |
| $n$ | number of nodes in the graph |
| $n^i$ | number of out links of node $i$ |
| $c$ | $(1 - c)$ is the restart probability |
| $r_{i,j}$ | proximity from node $i$ to node $j$ |
| $\mathbf{r}_i = [r_{i,j}]$ | ranking vector for node $i$ ($j = 1, \ldots, n$) |
| $\mathcal{P}$ | positive set $\mathcal{P} = \{x_1, \ldots, x_{n^+}\}$ |
| $\mathcal{N}$ | negative set $\mathcal{N} = \{y_1, \ldots, y_{n^-}\}$ |
| $n^+$ | number of positive nodes $n^+ = |\mathcal{P}|$ |
| $n^-$ | number of negative nodes $n^- = |\mathcal{N}|$ |
| $\mathbf{e}_i$ | $n \times 1$ starting vector for node $i$, where $\mathbf{e}_i(i) = 1$ and $\mathbf{e}_i(j) = 0 (j \neq i)$ |
| $\mathbf{0}^{i \times j}$ | An $i \times j$ matrix with all values set to zero |

FIG. 2

$$\begin{pmatrix} 0 & 0.33 & 0 & 0 & 0.33 & 0 & 0 & 0 & 0.25 & 0 & 0 & 0 & 0 \\ 0.33 & 0 & 0.5 & 0.5 & 0 & 0 & 0 & 0 & 0 & 0 & 0 & 0 & 0 \\ 0 & 0.33 & 0 & 0.5 & 0 & 0 & 0 & 0 & 0 & 0 & 0 & 0 & 0 \\ 0 & 0.33 & 0.5 & 0 & 0 & 0 & 0 & 0 & 0 & 0 & 0 & 0 & 0 \\ 0.33 & 0 & 0 & 0 & 0 & 0.5 & 0 & 0.5 & 0 & 0 & 0 & 0 & 0 \\ 0 & 0 & 0 & 0 & 0.33 & 0 & 0.5 & 0 & 0 & 0 & 0 & 0 & 0 \\ 0 & 0 & 0 & 0 & 0 & 0.5 & 0 & 0.5 & 0 & 0 & 0 & 0 & 0 \\ 0 & 0 & 0 & 0 & 0.33 & 0 & 0.5 & 0 & 0 & 0 & 0 & 0 & 0 \\ 0.33 & 0 & 0 & 0 & 0 & 0 & 0 & 0 & 0 & 0.5 & 0.5 & 0 & 0.33 \\ 0 & 0 & 0 & 0 & 0 & 0 & 0 & 0 & 0.25 & 0 & 0 & 0 & 0.33 \\ 0 & 0 & 0 & 0 & 0 & 0 & 0 & 0 & 0.25 & 0 & 0 & 0.5 & 0 \\ 0 & 0 & 0 & 0 & 0 & 0 & 0 & 0 & 0 & 0 & 0.5 & 0 & 0.33 \\ 0 & 0 & 0 & 0 & 0 & 0 & 0 & 0 & 0.25 & 0.5 & 0 & 0.5 & 0 \end{pmatrix}$$

$$\begin{pmatrix} 0 & 0.33 & 0 & 0 & 0.01 & 0 & 0 & 0 & 0.25 & 0 & 0 & 0 & 0 \\ 0.25 & 0 & 0.5 & 0.5 & 0 & 0 & 0 & 0 & 0 & 0 & 0 & 0 & 0 \\ 0 & 0.33 & 0 & 0.5 & 0 & 0 & 0 & 0 & 0 & 0 & 0 & 0 & 0 \\ 0.25 & 0.33 & 0.5 & 0 & 0 & 0 & 0 & 0 & 0 & 0 & 0 & 0 & 0 \\ 0.25 & 0 & 0 & 0 & 0 & 0 & 0 & 0.5 & 0 & 0 & 0 & 0 & 0 \\ 0 & 0 & 0 & 0 & 0.01 & 0 & 0.1 & 0 & 0 & 0 & 0 & 0 & 0 \\ 0 & 0 & 0 & 0 & 0 & 0 & 0 & 0.5 & 0 & 0 & 0 & 0 & 0 \\ 0 & 0 & 0 & 0 & 0.01 & 0 & 0.1 & 0 & 0 & 0 & 0 & 0 & 0 \\ 0.25 & 0 & 0 & 0 & 0 & 0 & 0 & 0 & 0 & 0.5 & 0.5 & 0 & 0.33 \\ 0 & 0 & 0 & 0 & 0 & 0 & 0 & 0 & 0.25 & 0 & 0 & 0 & 0.33 \\ 0 & 0 & 0 & 0 & 0 & 0 & 0 & 0 & 0.25 & 0 & 0 & 0.5 & 0 \\ 0 & 0 & 0 & 0 & 0 & 0 & 0 & 0 & 0 & 0 & 0.5 & 0 & 0.33 \\ 0 & 0 & 0 & 0 & 0 & 0 & 0 & 0 & 0.25 & 0.5 & 0 & 0.5 & 0 \end{pmatrix}$$

Algorithm 1 Add Links for One Negative Node

Input: The adjacency matrix $\mathbf{A}$, the negative node $y$, the neighborhood size $k$ and $c$.

Output: The updated adjacency matrix $\tilde{\mathbf{A}}$.

11-1   initialize $\tilde{\mathbf{A}} = \mathbf{A}$, $\tilde{\mathbf{A}}(n+1,:) = 0$, and $\tilde{\mathbf{A}}(:,n+1) = 0$.

11-2   get the ranking vector for the negative node $y$ by $\mathbf{r}_y = c\mathbf{A}\mathbf{r}_y + (1-c)\mathbf{e}_y$. Let $\epsilon := k^{\text{th}}$ largest element in $\mathbf{r}_y$.

11-3   for each node $i$ do

11-4     if $\mathbf{r}_{y,l} \geq \epsilon$ then

11-5       set $\tilde{\mathbf{A}}(n+1, l) = \mathbf{r}_{y,i}/\mathbf{r}_{y,y}$ 11-6       set $\tilde{\mathbf{A}}(1:n, i) = (1 - \mathbf{r}_{y,i}/\mathbf{r}_{y,y})\tilde{\mathbf{A}}(1:n, i)$ 11-7     end if

11-8   end for

11-9   output $\tilde{\mathbf{A}} = \tilde{\mathbf{A}}(1:n, 1:n)$.

FIG. 11

Algorithm 2 ProSIN

Input: The adjacency matrix $\mathbf{A}$, the source node $s$ and the target node $t$, the side information $\mathcal{P}$ and $\mathcal{N}$, the neighborhood size $k$, and the parameter c.

Output: the proximity score $\tilde{r}_{s,t}$ from source $s$ to target $t$.

12-1  initialize $\tilde{\mathbf{A}} = \mathbf{A}$
12-2  if $n^+ > 0$ then
12-3   $\tilde{\mathbf{A}}(:,s) = n^s/(n^s + n^+)\tilde{\mathbf{A}}(:,s)$
12-4   for each positive node $x$ in $\mathcal{P}$ do
12-5    $\tilde{\mathbf{A}}(x,s) = \tilde{\mathbf{A}}(x,s) + 1/(n^s + n^+)$.
12-6   end for
12-7  end if
12-8  if $n^- > 0$ then
12-9   for each negative node $y$ in $\mathcal{N}$ do
12-10    update $\tilde{\mathbf{A}}$ by Alg. 1
12-11   end for
12-12 end if
12-13 solve the equation $\tilde{\mathbf{r}}_s = c\tilde{\mathbf{A}}\tilde{\mathbf{r}}_s + (1-c)\mathbf{e}_s$.
12-14 output $\tilde{r}_{s,t} = \tilde{\mathbf{r}}_s(t)$.

FIG. 12

Algorithm 3A NB_LIN
Input: The normalized adjacency matrix A, the source node $s$ and $c$
Output: The ranking vector for source node $r_s$
   Pre-compute stage (NB_LIN_Pre())
   p1 Do low-rank approximation for $A = USV$;
   p2 pre-compute and store the matrix $\Lambda = (S^{-1} - cVU)^{-1}$
   On-Line Query Stage (NB_LIN_OQ())
   q1 output $r_s = (1-c)(e_s + cU\Lambda V e_s)$

Algorithm 3B Low Rank Approximation by Partition
Input: The cross-partition matrix A2 and $t$
Output: Low rank approximation of A2: U, S, V
13-1. Partition A2 into $t$ partitions;
13-2. Construct an n × t matrix U. The $i^{th}$ column of U is the sum of all the columns of A2 that belong to the $i^{th}$ partition;
13-3. Compute $S = (U^T U)^{-1}$;
13-4. Compute $V = U^T A2$.

FIG. 13
(PRIOR ART)

Algorithm 4 Fast-ProSIN

Input: The adjacency matrix $\mathbf{A}$, the source node $s$, the side information $\mathcal{P}$ and $\mathcal{N}$, the neighborhood size $k$, and the parameter $c$.

Output: the ranking vector $\tilde{\mathbf{r}}_s$ for the source $s$.

16-1 Pre-Compute Stage
16-2 call $[\mathbf{U}, \Lambda, \mathbf{V}] = \text{NB\_LIN\_Pre}(\mathbf{A}, c)$
16-3 On-Line Query (Feedback) Stage
16-4 initialize $i_0 = 1$ and $\Theta = \mathbf{0}^{(kn^- + 1) \times 2}$
16-5 for each negative node $y$ in $\mathcal{N}$ do
16-6     call $\mathbf{r}_y = \text{NB\_LIN\_OQ}(c, \mathbf{U}, \Lambda, \mathbf{V}, \mathbf{e}_y)$.
16-7     let $\epsilon :=$ $k^{\text{th}}$ largest element in $\mathbf{r}_y$.
16-8     for each node $i$ s.t. $\mathbf{r}_{y,i} \geq \epsilon$ do
16-9       set $\Theta(i_0, 1) = i$ and $\Theta(i_0, 2) = 1 - \mathbf{r}_{y,i}/\mathbf{r}_{y,y}$
16-10       increase $i_0$ by 1
16-11     end for
16-12 end for
16-13 set $\Theta(i_0, 1) = s$ and $\Theta(i_0, 2) = n^s/(n^s + n^+)$
16-14 set $\tilde{\mathbf{U}} = \mathbf{U}$ and $\tilde{\mathbf{V}} = \mathbf{V}$
16-15 for $i = 1 : kn^- + 1$ do
16-16     set $\mathbf{X}(i, :) = \mathbf{U}(\Theta(i, 1), :)$
16-17     set $\mathbf{Y}(:, i) = \mathbf{V}(:, \Theta(i, 1))(\Theta(i, 2) - 1)$
16-18     set $\tilde{\mathbf{V}}(:, \Theta(i, 1)) = \mathbf{V}(:, \Theta(i, 1))\Theta(i, 2)$
16-19 end for
16-20 compute $\mathbf{L} = (\mathbf{I} - c\mathbf{X}\Lambda\mathbf{Y})^{-1}$
16-21 update $\tilde{\Lambda} = \Lambda + c\Lambda\mathbf{Y}\mathbf{L}\mathbf{X}\Lambda$
16-22 set $\mathbf{e}_+ = \mathbf{0}^{n \times 1}$, $\mathbf{e}_+(\mathcal{P}) = 1/(n^s + n^+)$
16-23 call $\hat{\mathbf{r}}_s = \text{NB\_LIN\_OQ}(c, \tilde{\mathbf{U}}, \tilde{\Lambda}, \tilde{\mathbf{V}}, \mathbf{e}_s)$
16-24 call $\mathbf{u} = \text{NB\_LIN\_OQ}(c, \tilde{\mathbf{U}}, \tilde{\Lambda}, \tilde{\mathbf{V}}, \mathbf{e}_+)$
16-25 output $\tilde{\mathbf{r}}_s = \hat{\mathbf{r}}_s + c\hat{\mathbf{r}}_s(s)/(1 - c - c\mathbf{u}(s))\mathbf{u}$

FIG. 16

$$r_i = cAr_i + (1-c)e_i,$$

where
- A is the column normalized adjacency matrix for the graph and
- $e_i$ is the starting vector for node $i$

FIG. 17

EFFICIENT CALCULATION OF NODE PROXIMITY ON GRAPHS WITH SIDE INFORMATION

CROSS-REFERENCE TO RELATED APPLICATION

The present invention is related to the following commonly-owned, United States patent application filed on even date herewith, the entire content and disclosure of which is expressly incorporated by reference herein as if fully set forth herein. U.S. patent application Ser. No. 12/638,531, for "MEASURING NODE PROXIMITY ON GRAPHS WITH SIDE INFORMATION".

BACKGROUND

The invention relates to the field of computerized systems and methods using graphs that include nodes, directed links, and link weights. In particular, the invention relates to applications where node proximity measurements are desired.

The invention is particularly useful in the field of graph mining. This field commonly applies to Internet applications such as recommendation systems and blog analysis. The fields of neighborhood search, center-piece sub-graphs, and image caption are also implicated.

In Internet database applications, data may be stored in the form of a graph including nodes, links (also called edges), and link weights. This structure shows relationships between pieces of information. These relationships can reflect how users perceive data. For instance, it is commonly desired to present new information to users that might be related to information previously accessed or products previously purchased. The behavior of the current user and/or other users may be used to predict interest in new information. Predictions of such interest can come from proximity measurements of the underlying graph structure.

The graph may be embodied as a matrix data structure on a machine readable medium. Proximity may be measured using a random walk algorithm. This algorithm commonly involves a matrix inversion, which tends to be a time intensive process that can negatively impact real time response.

A related work in this field is H. Tong, C. Faloutsos, and J.-Y. Pan, "Random Walk with Restart: Fast Solutions and Applications," Knowledge and information systems, an International Journal (*KAIS*) 2008 ("RWR paper"). This paper appears is incorporated by reference, and relates to matrix representations of graphs and using random walk with restart to measure proximity in such graphs. The paper proposes an improvement to the random walk algorithm, summarized in algorithm 3*a* shown in FIG. 13 of the present application. Algorithm 3*a* includes a pre-compute stage and an online query stage. The pre-compute stage includes calculating a low rank approximation in accordance with algorithm 3*b*, shown in FIG. 13.

SUMMARY

One issue to be solved in this context is how to incorporate side information, especially positive and negative user feedback, into proximity calculations without full matrix inversion, i.e. without full application of the method of the RWR paper.

Side information can be gleaned in numerous ways. For instance, in recommendation systems, side information could be user ratings of content. In blog analysis, it could be opinions and sentiments. Click-through data can also reflect user preferences.

Advantageously, a computer method for evaluating data will include performing operations on at least one data processing device. The operations will include:

maintaining an embodiment of a weighted, directed graph representation of the data on a machine readable medium, the embodiment including representations of nodes, links, link weights, and random walk results indicating proximity of nodes to one another;

receiving indications of a source and target node within the graph;

receiving side information indicating positive and/or negative feedback relating to nodes of the graph; and providing a machine readable embodiment of an indication of an updated proximity between the source and target node, responsive to the side information, without recalculating random walk results for the entire graph, the indication being embodied on a medium.

A system may also be advantageous. The system will include at least one data processing device. The system will also include at least one network and/or user interface device for communicating with the data processing device. The system will further include at least one medium for embodying at least machine performable code and data in machine readable form; the code comprising instructions for causing the data processing device to perform operations on the data. The operations thus performed will be the same as for the computer method.

A program product may also be advantageous. The program product will be for performing operations and will include at least one storage medium readable by a processing circuit and storing instructions to be run by the processing circuit for performing a method. The method will be the same as set forth above.

BRIEF DESCRIPTION OF THE DRAWINGS

Embodiments will now be described by way of non-limiting example with respect to the following figures.

FIG. 2 is a table of symbols.
FIG. 11 shows an algorithm for adding links for negative nodes.
FIG. 12 shows an algorithm for updating random walk with restart results responsive to side information.
FIG. 13 shows a prior art algorithm for random walk with restart.

FIG. 16 shows a more detailed algorithm relating to FIGS. 14 and 15.

FIG. 17 gives an equation.

DETAILED DESCRIPTION OF THE PREFERRED EMBODIMENTS

More information about the invention, especially test results, appears in Tong, H., Qu, H., and Jamjoom, H. "Measuring Proximity on Graphs with Side Information," Proceedings of the 2008 Eighth IEEE international Conference on Data Mining (Dec. 15-19, 2008). ICDM. IEEE Computer Society, Washington, D.C., 598-607 ("Side Information Paper"), which is incorporated herein by reference. This paper is not prior art, because it was published less than one year prior to the filing of the present application.

Definition of a Problem

Figure 1:
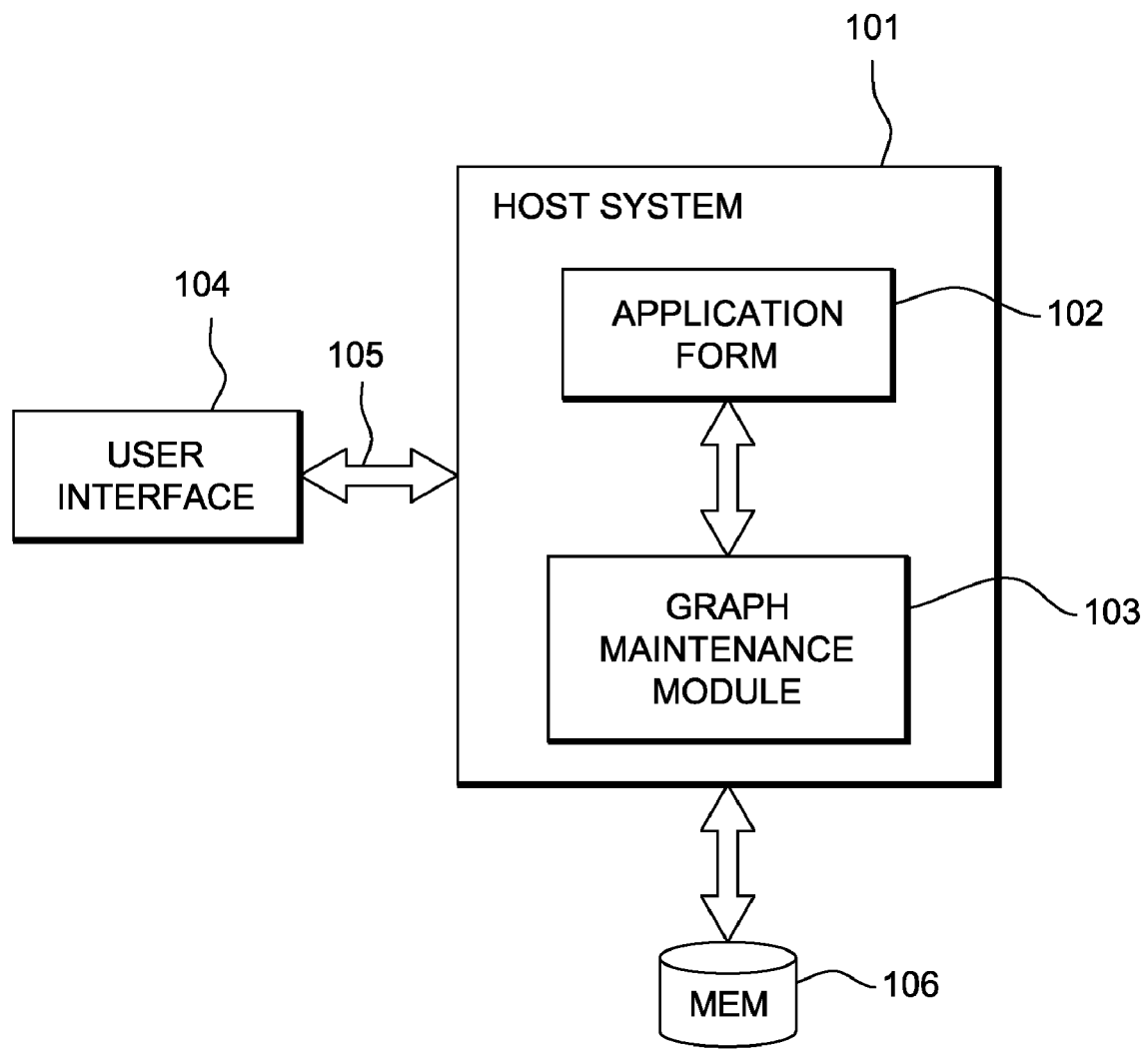
FIG. 1 shows a general system diagram.

FIG. 1 shows a computer system suitable for running the invention. The system includes a processor 101, which may be of any suitable type. On the processor, modules are in operation, in particular at least one application program 102 and a graph maintenance module 103. The invention relates to improved operation of the graph maintenance module 103. The processor 101 communicates with a user interface 104—via some transmission medium 105, which may be wired or wireless and may include a network such as the Internet. The user interface 104 may include a screen with some user friendly graphical user interface, a keyboard, a pointing device, a microphone, a camera, voice recognition software, or any other suitable devices for transmitting or receiving information to or from a user. Processor(s) 101 make use of one or more media 106 to store data and computer program code. Any data structures referred to herein, such as matrices, scalars, and vectors are to be understood as embodied in machine readable form in at least one medium 106. Such media might be of any suitable type, such as magnetic, electronic, solid state, or optical. The various components of the system of FIG. 1 need not be in the same premises in order to cooperate with one another. Elements illustrated in the figure as singular may in practice be plural and cooperating together. Elements illustrated as separate may in practice be integrated together.

Table 1, shown in FIG. 2 lists the main symbols used herein and their associated definitions. An adjacency matrix, A, represents a general graph. Capital letters, e.g. A, represent matrices, lower case bold represent vectors, e.g. a, and calligraphic fonts represent sets, e.g. I. The tilde, "~" indicates a matrix with side information added. For example, A is the normalized adjacency matrix of the graph without side information; and Ã is the normalized adjacency matrix of the graph refined by side information. A(i, j) is the element at the $i^{th}$ row and $j^{th}$ column of the matrix A, and A(:, j) is the $j^{th}$ column of A, etc. A running example, depicted in FIG. 3, describes the problem statement. There, each node represents a person. For instance, node 1 is 'John', node 2 is 'Smith', etc. The existence of an edge or link represents some social contact between the two corresponding people, e.g., a phone call. In traditional settings of proximity measurement, the goal is to quantify the closeness, i.e., relevance, between two nodes based on the link structure of the underlying graph. Then when the proximity of two nodes is measured, one will be considered the "source," or the node measured from—and the other will be considered the "target," namely the node measured to. The terms "link" and "edge" will be used interchangeably herein.

A challenge is to incorporate side information, especially user like/dislike feedback. In the running example, a user might not want to see node 6 but favors node 4. Two sets $\mathcal{P}$ and $\mathcal{N}$ formally represent positive and side information. The set $\mathcal{P}$ contains the node indices that users like—referred to as the "positive set," in which the corresponding nodes are referred to as "positive nodes". The set $\mathcal{N}$ contains the node indices that users dislike—referred as "negative set," in which the corresponding nodes are referred to as "negative nodes". In the running example, both the positive set $\mathcal{P}$ and the negative set $\mathcal{N}$ contain one single element, respectively: $\mathcal{P} = \{4\}$ and $\mathcal{N} = \{6\}$. In a practical example these sets might have more or less members. It is desirable to incorporate such side information to measure the node proximity (e.g., the proximity from node 1 to the node 3 in the example).

With the above notations and assumptions in mind, one embodiment of a formal problem statement is given as problem 1 below.

Problem 1 (Proximity with Side Information)

Given: a weighted direct graph A, a source node s and a target node t, and side information $\mathcal{P}$ and $\mathcal{N}$;

Find: the proximity score $\tilde{r}_{s,t}$ from source node s to target node t.

In problem 1, if the target node t is absent, the proximity score $\tilde{r}_{s,i}$ (i=1, . . . , n) from the source node measures proximity from s to all the other nodes in the graph. A column vector $\tilde{r}_s = \tilde{r}_{s,i}$ I=1, . . . , n) that is a stack of proximity scores is equivalent to computing the ranking vector $\tilde{r}_s$ for the source node s. For simplicity of description here, the examples will take the positive set and negative sets as non-overlapping, i.e., $\mathcal{P} \cap \mathcal{N} = \phi$. Overlapping nodes are normally ignored if they exist in both positive set and negative set without further information. Also, the positive and negative side information do not need to exist simultaneously. For example, if there is only positive side information, the negative set can be empty (i.e., $\mathcal{N} = \phi$).

ProSIN™

This section will introduce proximity measurement with side information, denoted ProSIN™, for convenience. The description will begin with a review of random walk with restart (RWR), which is a known proximity measurement for the case where there is no side information. An extension of RWR to properly account for side information will follow.

RWR: Proximity without Side Information

Random walk with restart (RWR) is a method for measuring proximity. For a given graph, RWR will now be explained. Consider a random particle that starts from node i. The particle iteratively transits to its neighbors with probabilities proportional to the corresponding edge weights. At each step, the particle can return to node i with some restart probability (1−c). The proximity score from node i to node j is defined as the steady-state probability $r_{i,j}$ that the particle will be on node j. More on this topic may be found in J.-Y. Pan, H.-J. Yang, C. Faloutsos, and P. Duygulu. "Automatic multimedia cross-modal correlation discovery," Knowledge Discovery and Data Mining, pages 653-658, (Seattle, Wash., Aug. 22-25, 2004)

Intuitively, $r_{i,j}$ is the fraction of time that the particle starting from node i will spend on each node j of the graph, after an infinite number of steps. A stack of all the proximity scores $r_{i,j}$ into a column $r_i$ is the "ranking vector" for the node i. Equation (1) of FIG. 17 gives the formal definition of RWR.

Figures 3, 4:
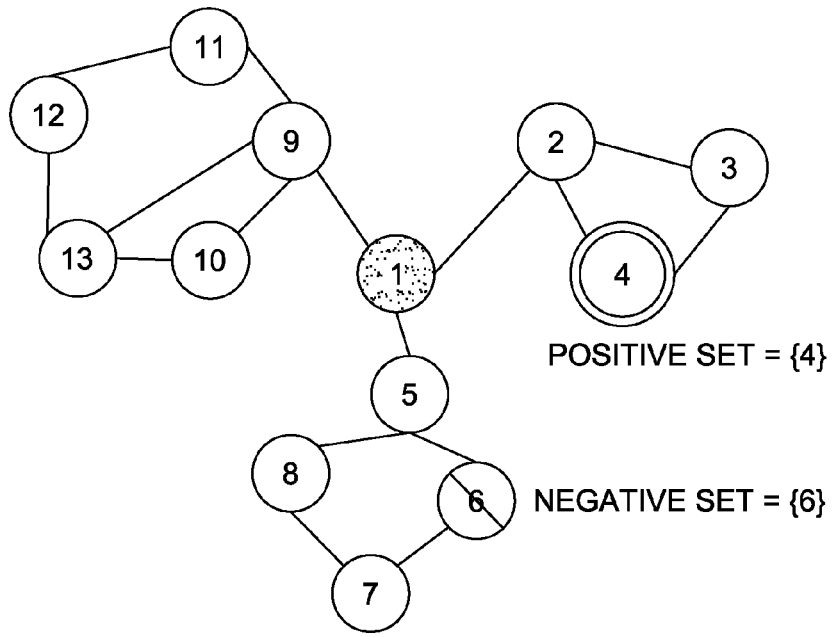
FIG. 3 shows a graph with respect to which side information has been received.
FIG. 4 shows an adjacency matrix for the graph of FIG. 3.
Figure 7:
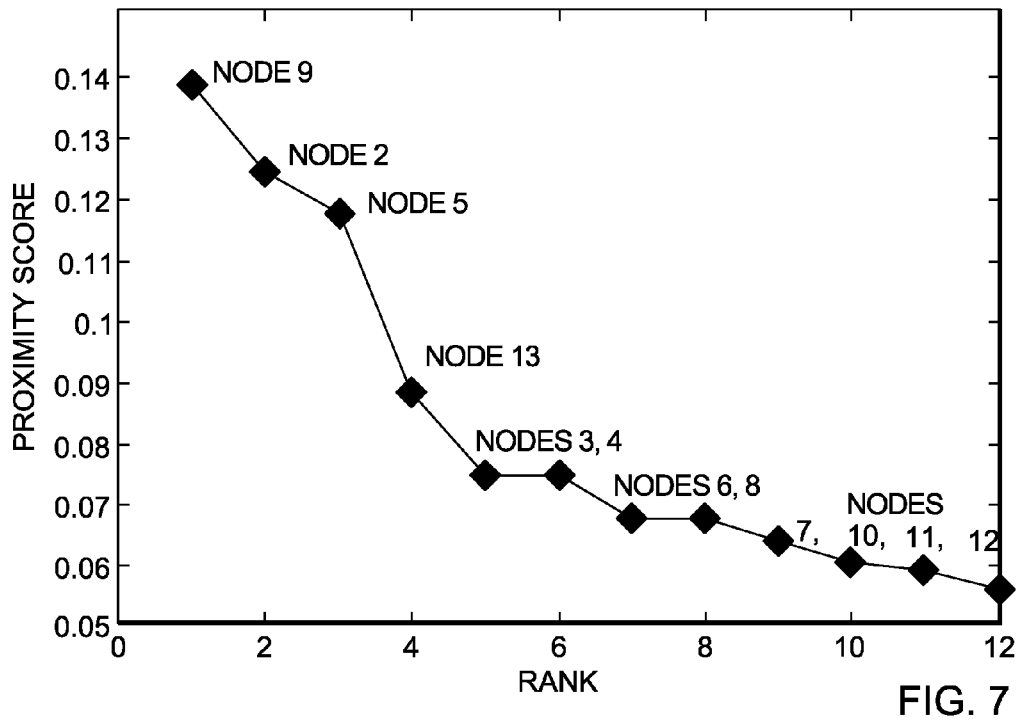
FIG. 7 shows a graph of proximity scores before side information is processed.

For the running example in FIG. 3, the normalized adjacency matrix A is shown in FIG. 4. Setting side information to the correct column vector, e.g. e1=[1, 0, 0, 0, 0, 0, 0, 0, 0, 0, 0, 0, 0]' allows for temporarily ignoring side information for node 1). Then the corresponding ranking vector can be found using equation (1). FIG. 7 plots the elements of the ranking vector—sorted from highest to lowest—for node 1 of the running example. In other words, the proximity score is graphed against the rank for given nodes. The proximity scores are normalized so that they sum up to 1. The scores are consistent with intuition. In other words, nodes that look near node 1, such as nodes 9, 2, and 5, in fact receive higher proximity scores.

ProSIN™: Proximity with Side Information

It is desirable to incorporate side information to measure the node proximity. Intuitively, for a given source node s, if positive nodes exist, the proximity score from the source node to such positive nodes as well as their neighboring nodes should increase, compared to the case where such side information is unavailable. In the running example, if node 4 belongs to the positive set $\mathcal{P}$, the proximity score from the source node 1 to node 4 ought to increase, as should the proximity scores from node 1 to node 4's neighboring nodes (e.g., node 2 and node 3). Analogously, if negative nodes exist, the proximity scores from the source node to such negative nodes as well as their neighboring nodes should decrease, compared to the case where such side information is unavailable. In the running example, if node 6 belongs to the negative set $\mathcal{P}$, the proximity score from node 1 to node 6 ought to decrease, and so will node 6's neighboring nodes (such as nodes 5 and 7). The basic idea of ProSIN™ is then to use side information to refine the original graph structure so that the random particle (a) has higher chances of visiting the positive nodes and their neighboring nodes, and (b) has lower chances of visiting the negative nodes and their neighboring nodes.

Dealing with Positive Nodes.

Each node x in the positive set ($\mathcal{P}$) is to link directly from the source node. For instance, in the running example, source node 1 will link directly to node 4, shown at 505 in FIG. 5. In this way, whenever the random particle visits (or restarts from) the source s, it has higher chances of visiting the nodes in the positive set. This direct linkage implicitly increases the chance that the random particle will visit the neighborhood of those positive nodes. The weight of each newly added link is set to $1/(n^s+n^+)$. For example, the newly added edge (1, 4) for the running example will receive a weight of 0.25 (since $n^1=3$ and $n^+=1$).

Dealing with Negative Nodes.

Figures 5, 6:
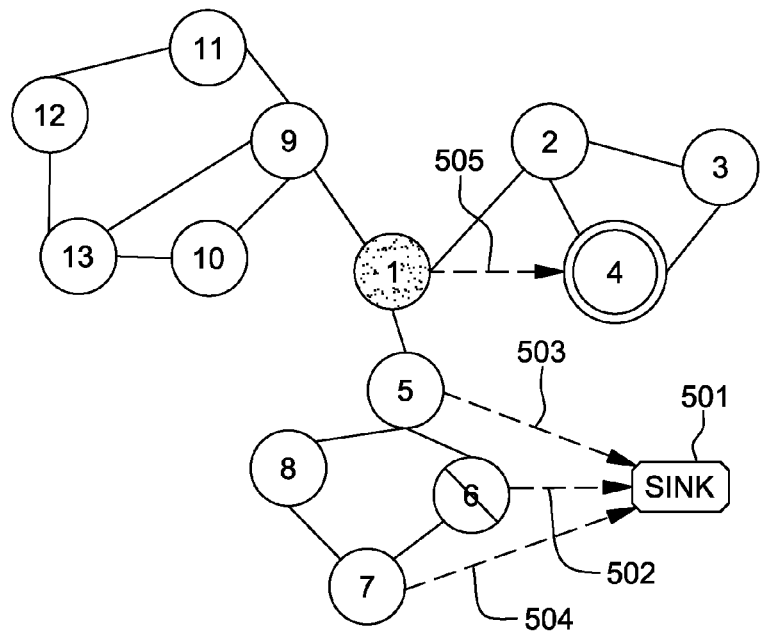
FIG. 5 shows the graph of FIG. 3 altered responsive to side information.
FIG. 6 shows an altered adjacency matrix responsive to the altered graph of FIG. 5.

To deal with the negative nodes, per FIG. 5, preferably a sink 501 is introduced into the graph, with no out link. For each node y in the negative set $\mathcal{P}$, a direct link is inserted from node y to the sink. Thus, whenever the random particle visits this node, it can go to the sink and never come back, since there is no out link from the sink. Therefore, this negative node y is penalized and its corresponding proximity score will decrease. In order to penalize the neighborhood of node y, the present embodiment adds a direct link from its neighboring nodes to the sink. In the running example, besides the link 502 from node 6 (the negative node) to the sink, there will be links 503 and 504 from nodes 5 and 7 (the neighboring nodes of node 6) to the sink, respectively, as shown in FIG. 5. FIG. 6 shows the updated column normalized adjacency matrix resulting from the altered graph of FIG. 5.

The following topics will now be addressed:
(a) how to choose the neighborhood of a negative node y, and
(b) how to determine the weights to the sink.

Figure 9:
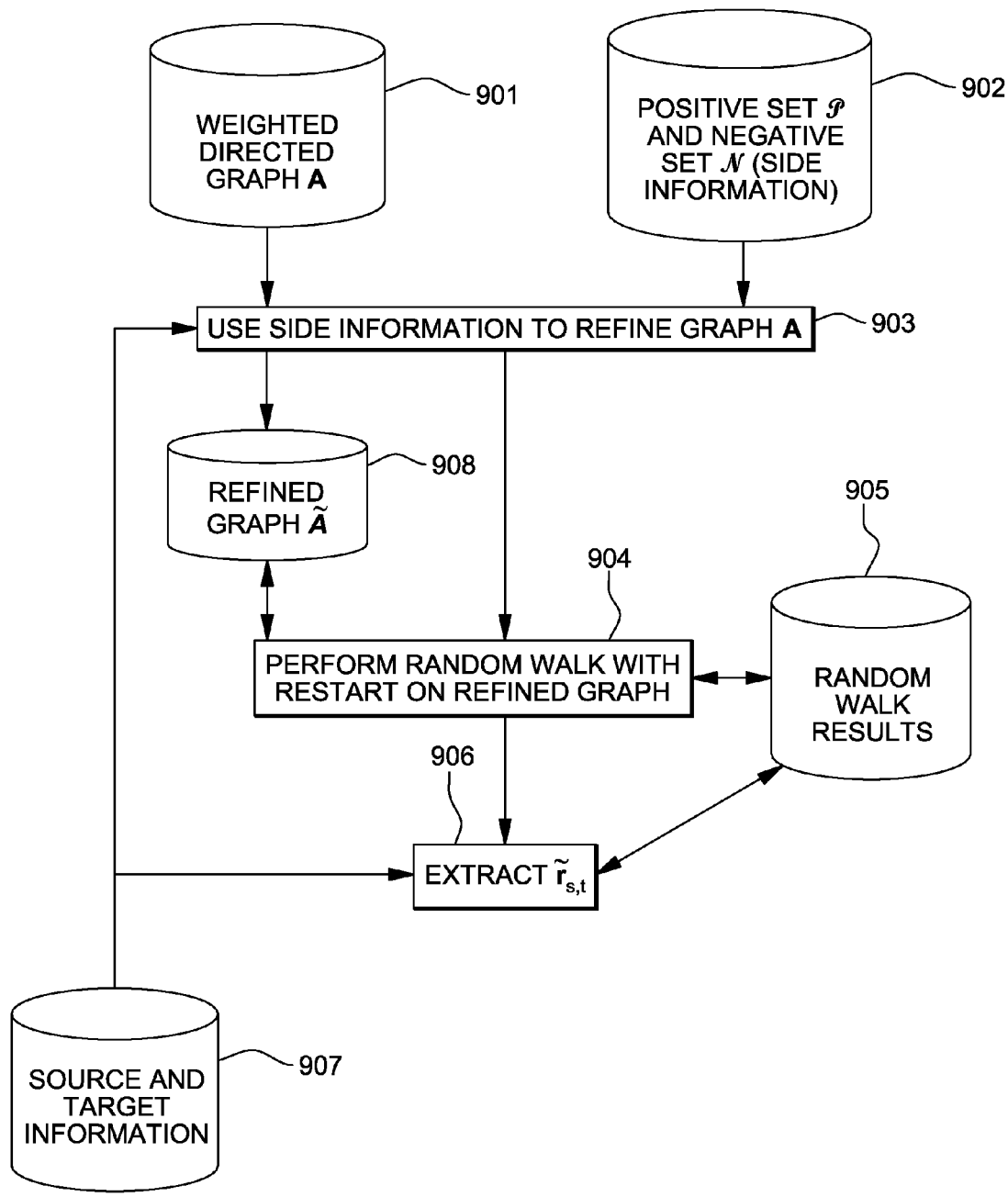
FIG. 9 shows an overview flowchart of a method for incorporating side information to alter a graph.

With the index of the sink node being n+1, the procedure is summarized in Algorithm 1, shown in FIG. 11 and the flowchart of FIG. 9.

The flowchart of FIG. 9 shows conceptually a graph maintenance module 103 of FIG. 1 that can incorporate positive and negative information into a graph A. The method starts from a weighted, directed graph A, embodied in a machine readable medium, at 901 and a positive set $\mathcal{P}$ and a negative set $\mathcal{P}$, also embodied in a machine readable medium, at 902, and prior random walk results embodied on a machine readable medium at 905. A graph A is refined to become a refined graph 908 at 903, e.g. as shown in FIGS. 5 and 6. Then random walk is performed with restart on the refined graph 908 at 904 using the prior random walk results, embodied on the medium, at 905. Source and target information, embodied on a medium 907 are used to yield $\tilde{r}_{s,t}$ at 906. While 901, 902, 905, 907, and 908 are shown conceptually as being separate in this figure; they might be embodied in a single medium or spread across any number of suitable media of any type usable by host system 101.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module.

Figure 10:
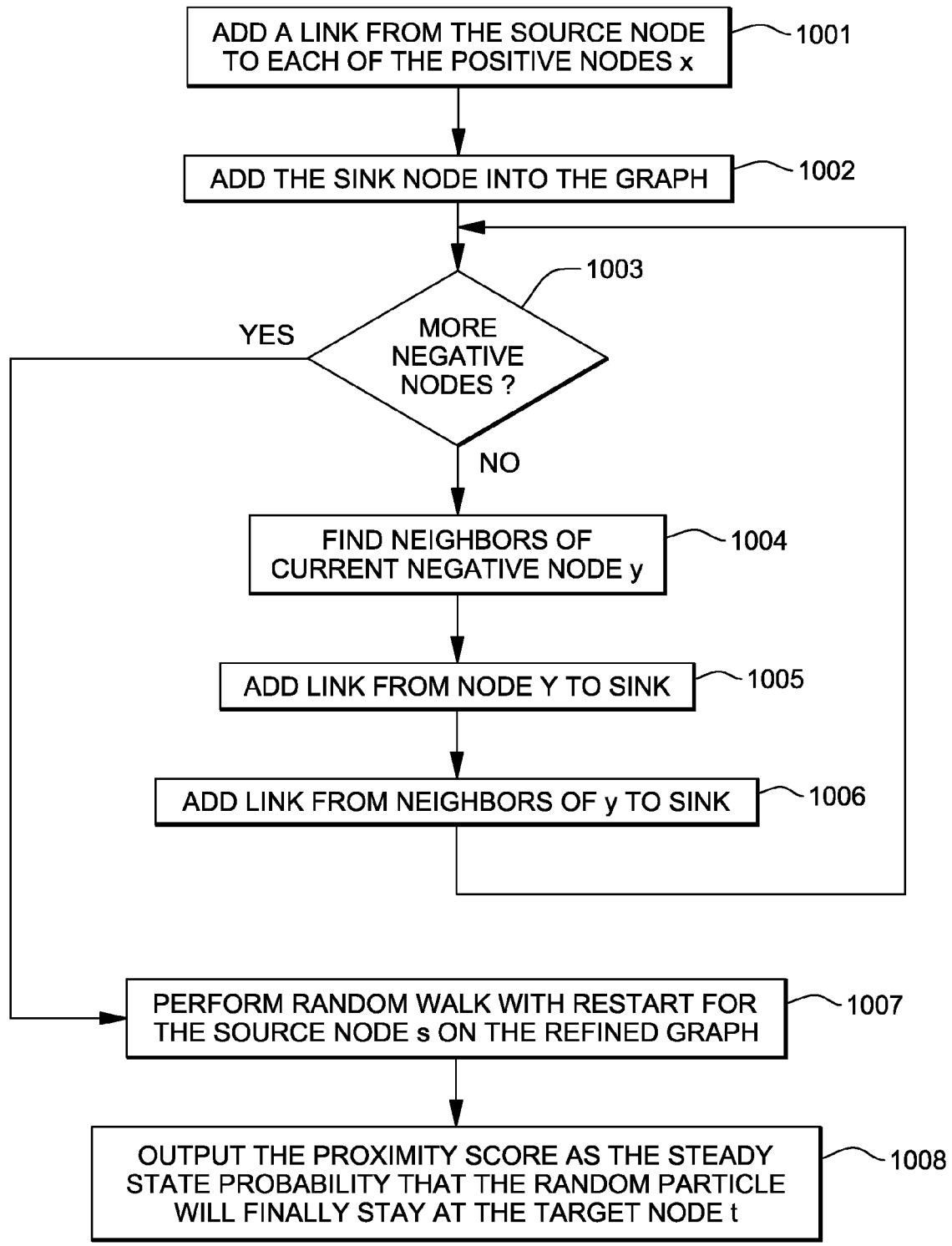
FIG. 10 shows a more detailed flowchart relating to altering a graph in response to side information.

FIG. 10 shows a flowchart that conceptually explains more about operation 903 from FIG. 9. At 1001, a link from the source node is added to each of the positive nodes x. At 1002, the sink node is added into the graph A. At 1003, a loop is implemented through the negative set $\mathcal{P}$. For each negative node y, neighbors are found at 1004. Then a link is added from negative node y is added to the sink at 1005 and then links are added from neighbors of y to the sink at 1006. Once the loop is finished, a random walk with restart is performed for the source node s on the refined graph at 1007 and the proximity score is the steady state probability that the random particle will finally stay at the target node t per 1008.

Algorithm 1, FIG. 11, gives more information about part of operations 1003-1006 from FIG. 10. Any algorithms given herein can be implemented as computer program code and stored on medium 106 to be performed on processor 101 as part of graph maintenance module 103, by the skilled artisan. Alternatively, they may be implemented as hardware. They are not intended to be executed manually or mentally. Initialization occurs at 11-1, where a refined graph $\tilde{A}$ is initialized and an extra row and column of zeroes are added for temporary calculation purposes. Algorithm 1 calculates random walk with restart on the original graph at line 11-2. Then it determines the neighborhood of the negative node y at steps 11-3 and 11-4. At lines 11-5 and 11-6, it determines the weights of the newly added links to the sink. Lines 11-7 and 11-8 are formal loop end commands. At line 11-9, the algorithm discards the last row/column, which corresponds to the sink node. The last row/column is used to simplify the description of the proposed method without affecting the ranking vector, by simulating a sink node.

ProSIN™ Algorithm.

Based on the preparations in algorithm 1, the algorithm to measure proximity with side information (ProSIN™) is given in Algorithm 2, see FIG. 12. In Algorithm 2, after initialization (line 12-1), side information is used to refine the graph structure: lines 12-2 through 12-7 for positive nodes per 1001; and lines 12-8 through 12-12 for negative nodes per 1003-1006. Line 12-3 ensures that the $s^{th}$ column of $\tilde{A}$ sums up to 1. Line 12-10 uses the same original graph A to add links for each negative node y. It is assumed that all the negative nodes are obtained in a batch mode. In other words, there is no ordering among different negative nodes. Then, a random walk with restart is performed on the refined graph (Ã) for the source node s (per line 12-13 and reference 904 of FIG. 9). The final output is the corresponding steady state probability as the proximity score (line 12-14 and reference 906 of FIG. 9).

Figure 8:
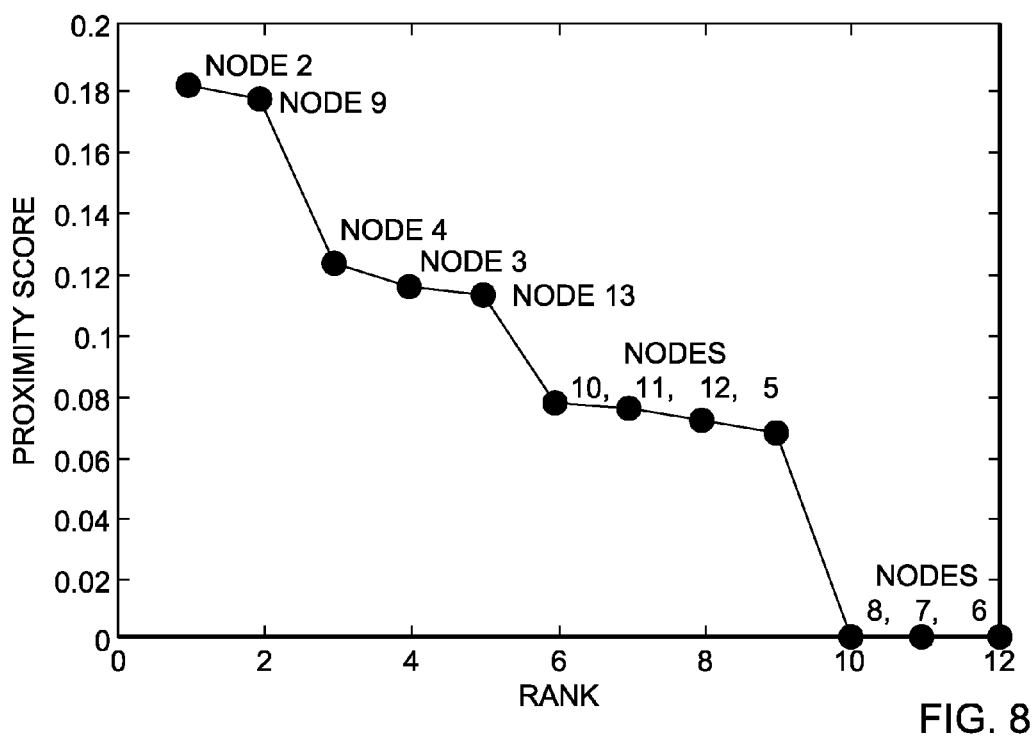
FIG. 8 shows a graph of proximity scores after side information is processed.

FIG. 8 plots elements of the ranking vector (sorted from highest to lowest) as a function of rank for node 1 of the running example with side information ($\mathcal{P} = \{4\}$, and $\mathcal{N} = \{6\}$) per algorithms 1 and 2. FIG. 8 is like FIG. 7, except after a process in accordance with algorithms 1 and 2 has run. Comparing FIGS. 7 and 8, it can be seen that the positive node (node 4) has gained higher proximity scores as have neighboring nodes 2 and 3. The negative node (node 6) has received lower scores, along with its neighboring nodes (nodes 5 and 7).

Fast-ProSIN™

It is desirable to create a faster solution for ProSIN. NB-LIN is a fast algorithm to compute random walk with restart (the proximity without side information), per the RWR paper. NB-LIN is presented below and then extended to include side information.

Background: NB LIN for RWR

According to the definition of RWR (equation (1)), FIG. 17, inversion of an n×n matrix is necessary in order to solve for $r_i$. This operation is prohibitively slow for large graphs. On the other hand, the iterative method (iterating equation (1) until convergence) might need many iterations, which is also not efficient. In RWR paper, the authors solve this problem using a low-rank approximation, followed by a matrix inversion of size l×l (where l is the rank of the low rank approximation) to get all possible proximity scores. Their solution, called NB LIN, can be further improved to allow side information.

Algorithm 3, FIG. 13, summarizes NB_LIN from the RWR paper. This algorithm is divided into two stages: NB_LIN_Pre( ) and NB_LIN_OQ( ) In NB_LIN_Pre( ) a low-rank approximation p1 is performed for the normalized adjacency matrix A using algorithm 3B of FIG. 13, which will not be repeated here, for brevity, as it appears in full in the figure.

Then, at p2, a matrix inversion is computed. Next, in NB_LIN_OQ( ) (line q1), only a small number of matrix-vector multiplications are computed to output the ranking vector.

The variable names used in algorithms 3A and 3B are local to those algorithms and do not overwrite values of the variables of the same in algorithm 4. They can only overwrite the parameters of the algorithm as called, per lines 16-6, 16-23, and 16-24.

FastProSIN™

Using only the method of the article of the RWR paper, i.e. FIG. 13, one would expect to have to perform the random walk with restart in two places in order to incorporate side information. First, one would have to process the original graph Ã (line 12-10 in Alg. 2); and then one would have to process the refined graph Ã to get the ranking vector for the source node s (line 12-13 in Alg. 2). The straightforward solution would be to utilize NB_LIN twice, once for A and once for Ã. Unfortunately, this does not fit the expected usage model of side information, which requires being responsive to users' real-time interests. Imagine a user is querying an author-conference bipartite graph, and s/he wants to know "which conferences are most similar to KDD." (Knowledge Discovery and Data Mining Conference) After the system gives the initial search results, s/he might further give her/his own preference—e.g., "dislike ICML" (International Conference on Machine Learning) and expect updated search results that matches her/his interests. This basically implies that calling NB_LIN_Pre( ) on the refined graph Ã is part of the on-line cost, which may pose a huge threat to the system's performance.

Figure 14:
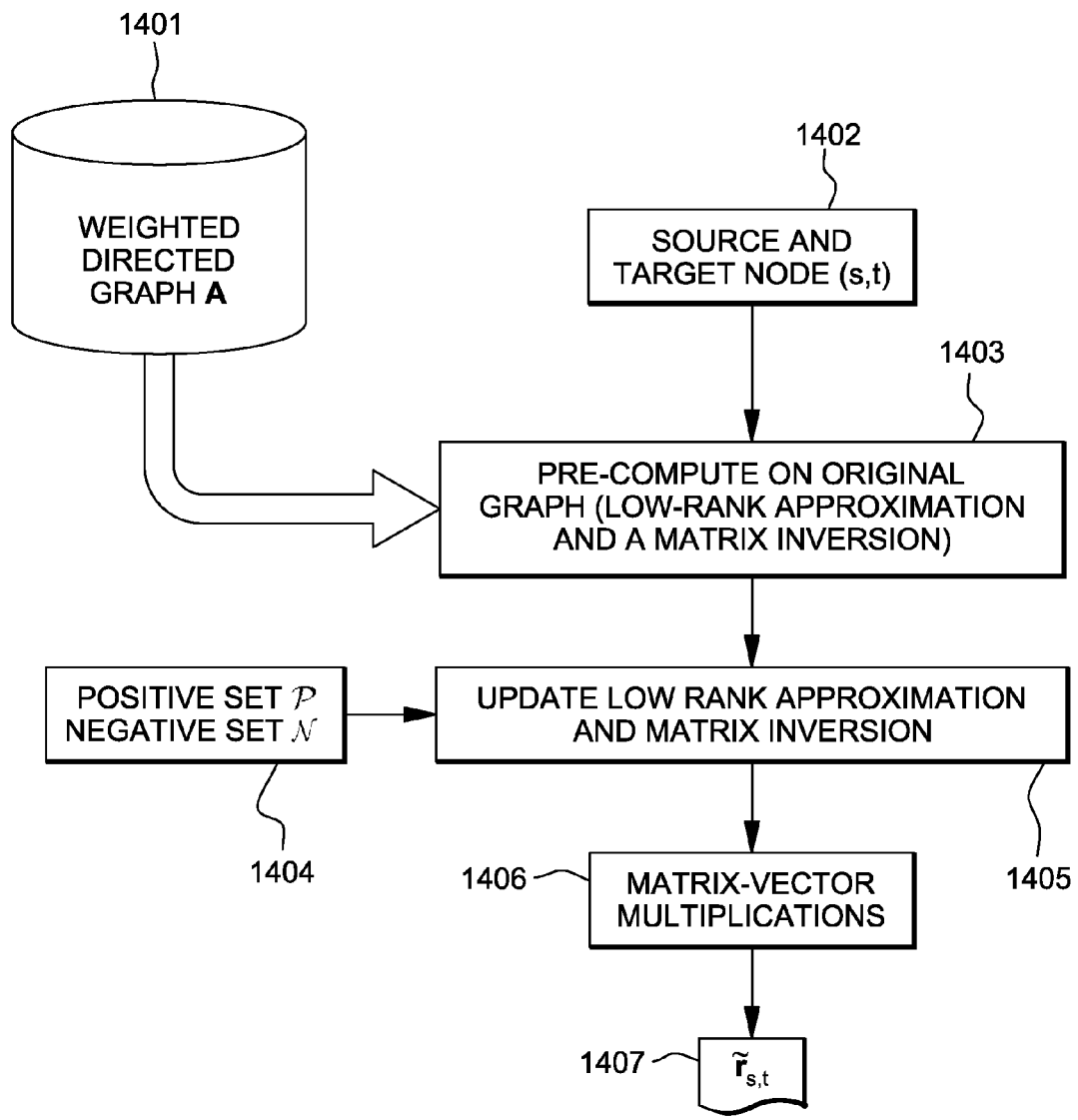
FIG. 14 shows an overview flowchart for altering random walk with restart results responsive to side information.

FIG. 14 is a flow-chart proposing a solution to this problem. From a weighted graph A 1401 and source and target notes (s, t), 1402, first a low rank approximation in accordance with algorithm 3B, FIG. 13—from the RWR paper—is run, along with a matrix inversion at 1403. Then, using a positive set $\mathcal{P}$ and a negative set $\mathcal{P}$ 1404, the low rank approximation and matrix inversion are selectively updated at 1405. As a result, only a few matrix vector multiplications are performed at 1406 before the result $\tilde{r}_{s,t}$ is output at 1407.

Figure 15:
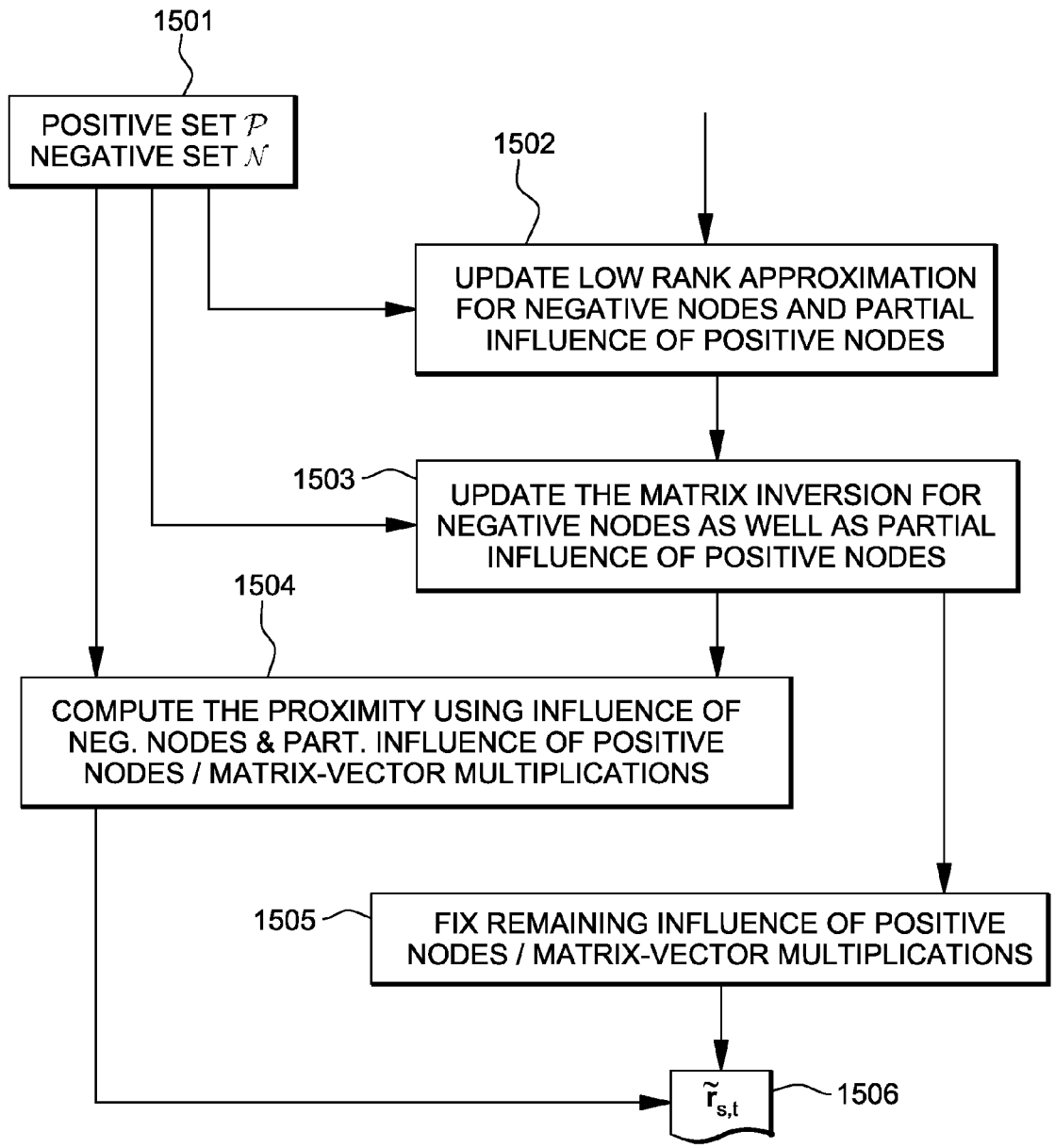
FIG. 15 shows a flowchart with more detail relating to FIG. 14.

FIG. 15 shows more detail of processing performed at 1405 and 1406. Reference 1501 corresponds to 1404 in the previous figure.

Fast-ProSIN™, which is given in Algorithm 4, FIG. 16, is a more detailed formulation of the method of FIG. 14 and FIG. 15. This algorithm yields the whole ranking vector $\tilde{r}_{s,t}$ for a given source node s, from which a single proximity score can be read out. For this formulation, it is assumed that both positive nodes and negative nodes are present. Fast-ProSIN™ first calls NB_LIN_Pre( ) (p1, p2, Algorithm 3A of FIG. 13) on the original adjacency matrix A (line 16-2, 1403, FIG. 14). Per 1502, FIG. 15, Fast-ProSIN™ then calls NB_LIN_OQ( ) (q1 Algorithm 3A of FIG. 13) to determine the influence of the negative nodes (lines 16-5 through 16-12, FIG. 16) and partial influence—i.e., scaling the sth column of the adjacency matrix by a factor of $n^s/(n^s+n^+)$ of positive nodes (line 16-13, FIG. 16)), both of which are used to update the low rank approximation (Ũ and Ṽ) as well as matrix Ã (1503, FIG. 15, lines 16-14 through 16-21, FIG. 16). This way, Fast-ProSIN™ avoids directly calling the function NB_LIN_Pre( ) on the refined graph Ã, where it would need to do a low-rank approximation and a matrix inversion, both of which are not efficient with respect to on-line costs. Finally, Algorithm 4 calls NB LIN OQ( ) twice (lines 16-23 and 16-24, FIG. 16) and combines them as the final ranking result (line 16-25, FIG. 16) per 1506, FIG. 15. Note that the second call on $e_+$ (line 16-24, FIG. 16) is used to compensate for the remaining influence of the positive nodes (i.e., adding new links from the source to the positive nodes) per 1505, FIG. 15, while line 16-23 corresponds to 1504, FIG. 15. This algorithm uses several intermediate value matrices X, Y, Θ, L, Ũ, Ṽ, Ã, whose values are defined in the algorithm. In the algorithm XΛV is the singular value decomposition of A, where Λ is a diagonal matrix. A result of the singular value decomposition is a low rank approximation.

A proof of the correctness of past-ProSIN™ appears in the Side Information Paper, as do experimental evaluations.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perforin method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the computer program product performs the one or more of functions of this invention. The present invention may include a computer program product for performing one or more of functions of this invention. The computer program product comprises a storage medium (e.g., a disk drive, optical disc, solid-state drive, etc.) readable by a processing circuit (e.g., a CPU or processor core) and storing instructions run by the processing circuit for performing the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation. The use of variable names in describing operations in a computer does not preclude the use of other variable names for achieving the same function. Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice.

What is claimed is:

1. A computer method for evaluating data, the method comprising performing operations on at least one data processing device, the operations comprising:

maintaining an embodiment of a weighted, directed graph representation of the data on a machine readable medium, the embodiment including representations of nodes, links, link weights, and random walk results indicating proximity of nodes to one another;

receiving indications of a source and target node within the graph;

receiving side information indicating positive and/or negative feedback relating to nodes of the graph; and providing a machine readable embodiment of an indication of an updated proximity between the source and target node, responsive to the side information, without recalculating random walk results for the entire graph, the indication being embodied on a medium.

2. The method of claim 1, wherein the graph is maintained in matrix form embodied in the medium;

random walk results comprise at least one pre-computed low rank approximation for a normalized adjacency matrix resulting from a singular value decomposition; and a matrix inversion result.

3. The method of claim 2, wherein providing comprises:

responsive to each negative node and a threshold neighborhood size, computing at least one respective intermediate matrix value;

responsive to positive nodes and at least one scaled column of the adjacency matrix, computing at least one respective further intermediate matrix value; and responsive to the intermediate and further intermediate matrix values, updating the low rank approximation and the matrix inversion result, so that a full recomputation of the inversion result is not necessary.

4. The method of claim 1, wherein
the graph is maintained in matrix form embodied in the medium;
random walk results comprise
   at least one pre-computed low rank approximation;
   at least one original matrix of ranking vectors; and
   at least one original matrix inversion result; and
providing comprises
   updating the low rank approximation and the matrix inversion result without a complete re-inversion operation; and
   performing intermediate value matrix-vector multiplications.

5. The method of claim 4, wherein updating comprises:
   creating a revised low rank approximation responsive to negative nodes, partial influence of positive nodes and the pre-computed low rank approximation; and
   creating a revised matrix inversion result, responsive to the negative nodes, partial influence of positive nodes, the original matrix inversion result; and the revised low rank approximation; and
   the matrix-vector multiplications compute proximity and fix a remaining influence of positive nodes using the revised low rank approximation and the revised matrix inversion result.

6. The method of claim 1, wherein the indication of proximity comprises a machine readable embodiment of a ranking vector.

7. The method of claim 1, wherein the indication of proximity is presented over a network as an indication of relationship between content.

8. The method of claim 1, wherein the indication of proximity is presented over a network as a ranking of content.

9. A system comprising:
   at least one data processing device;
   at least one network and/or user interface device for communicating with the data processing device;
   at least one medium for embodying at least machine performable code and data in machine readable form; the code comprising instructions for causing the data processing device to perform operations on the data, the operations comprising:
      maintaining an embodiment of a weighted, directed graph representation of the data on a machine readable medium, the embodiment including representations of nodes, links, link weights, and random walk results indicating proximity of nodes to one another;
      receiving indications of a source and target node within the graph;
      receiving side information indicating positive and/or negative feedback relating to nodes of the graph; and
      providing a machine readable embodiment of an indication of an updated proximity between the source and target node, responsive to the side information, without recalculating random walk results for the entire graph, the indication being embodied on a medium.

10. The system of claim 9, wherein
the graph is maintained in matrix form embodied in the medium;
random walk results comprise:
   at least one pre-computed low rank approximation;
   at least one original matrix of ranking vectors; and
   at least one original matrix inversion result; and
providing comprises:
   updating the low rank approximation and the matrix inversion result without a complete re-inversion operation; and
   performing intermediate value matrix-vector multiplications.

11. The system of claim 10, wherein updating comprises:
   creating a revised low rank approximation responsive to negative nodes, partial influence of positive nodes and the pre-computed low rank approximation; and
   creating a revised matrix inversion result, responsive to the negative nodes, partial influence of positive nodes, the original matrix inversion result; and the revised low rank approximation; and
   the matrix-vector multiplications compute proximity and fix a remaining influence of positive nodes using the revised low rank approximation and the revised matrix inversion result.

12. The system of claim 11, wherein the indication of proximity comprises a machine readable embodiment of a ranking vector.

13. The system of claim 9, wherein the indication of proximity is presented over a network as an indication of relationship between content.

14. The system of claim 9, wherein the indication of proximity is presented over a network as a ranking of content.

15. A computer program product for performing operations, the computer program product comprising at least one storage medium readable by a processing circuit and storing instructions to be run by the processing circuit for performing a method comprising:
   maintaining a machine readable embodiment of a weighted, directed graph representation of the data, the embodiment including representations of nodes, links, link weights, and random walk results indicating proximity of nodes to one another;
   receiving indications of a source and target node within the graph;
   receiving side information indicating positive and/or negative feedback relating to nodes of the graph; and
   providing a machine readable embodiment of an indication of an updated proximity between the source and target node, responsive to the side information, without recalculating random walk results for the entire graph.

16. The program product of claim 15, wherein
the graph is maintained in matrix form embodied in the medium;
random walk results comprise:
   at least one pre-computed low rank approximation;
   at least one original matrix of ranking vectors; and
   at least one original matrix inversion result; and
providing comprises:
   updating the low rank approximation and the matrix inversion result without a complete re-inversion operation; and
   performing intermediate value matrix-vector multiplications.

17. The program product of claim 16, wherein updating comprises:
   creating a revised low rank approximation responsive to negative nodes, partial influence of positive nodes and the pre-computed low rank approximation; and
   creating a revised matrix inversion result, responsive to the negative nodes, partial influence of positive nodes, the original matrix inversion result; and the revised low rank approximation; and
   the matrix-vector multiplications compute proximity and fix a remaining influence of positive nodes using the revised low rank approximation and the revised matrix inversion result.

18. The program product of claim 15, wherein the indication of proximity comprises a machine readable embodiment of a ranking vector.

19. The program product of claim 15, wherein the indication of proximity is presented over a network as an indication of relationship between content.

20. The program product of claim 15, wherein the indication of proximity is presented over a network as a ranking of content.

* * * * *